United States Patent
Lee et al.

(10) Patent No.: US 8,209,328 B2
(45) Date of Patent: Jun. 26, 2012

(54) ELECTRONIC DEVICE AND METHOD FOR SEEKING FILE POSITION

(75) Inventors: Chung-I Lee, Taipei Hsien (TW);
Chien-Fa Yeh, Taipei Hsien (TW);
Chiu-Hua Lu, Taipei Hsien (TW);
Cheng-Feng Tsai, Taipei Hsien (TW);
Shan-Chuan Jeng, Taipei Hsien (TW);
Yu-Feng Chien, Taipei Hsien (TW);
Tsung-Hsin Yen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 50 days.

(21) Appl. No.: 12/905,098

(22) Filed: Oct. 15, 2010

(65) Prior Publication Data
US 2012/0016914 A1    Jan. 19, 2012

(30) Foreign Application Priority Data
Jul. 16, 2010   (TW) ................ 99123373 A

(51) Int. Cl.
*G06F 7/00*  (2006.01)

(52) U.S. Cl. ........................ 707/724; 707/729

(58) Field of Classification Search .............. 707/724, 707/729, 918, 999.205; 702/80; 348/116
See application file for complete search history.

(56) References Cited

U.S. PATENT DOCUMENTS

| | | | | |
|---|---|---|---|---|
| 5,890,168 A * | 3/1999 | Lawerman | ................ | 1/1 |
| 6,785,768 B2 * | 8/2004 | Peters et al. | ................ | 711/112 |
| 6,928,459 B1 * | 8/2005 | Sawdon et al. | ................ | 1/1 |
| 7,039,784 B1 * | 5/2006 | Chen et al. | ................ | 711/170 |
| 7,406,491 B1 * | 7/2008 | Iwano | ................ | 1/1 |
| 7,624,136 B2 * | 11/2009 | Kawate et al. | ................ | 386/239 |
| 2004/0236805 A1 * | 11/2004 | Gordon | ................ | 707/205 |
| 2007/0112900 A1 * | 5/2007 | Arrouye et al. | ................ | 707/205 |
| 2008/0281884 A1 * | 11/2008 | Subrahmanyam | ................ | 707/205 |

* cited by examiner

*Primary Examiner* — James Trujillo
*Assistant Examiner* — Linh Black
(74) *Attorney, Agent, or Firm* — Altis Law Group, Inc.

(57) ABSTRACT

A method for seeking a file position of a file first seeks an estimated file position corresponding to a specified time point in the file, and adjusts the estimated file position according to a preset estimation formula. The method further determines the estimated file position is an accurate file position of the specified time point in the file until a difference between the estimated file position and the specified time point is less than a preset value.

15 Claims, 2 Drawing Sheets

ELECTRONIC DEVICE AND METHOD FOR SEEKING FILE POSITION

BACKGROUND

1. Technical Field

Embodiments of the present disclosure relate to multimedia playing technology, and particularly to an electronic device and method for seeking a file position corresponding to a specified time point of the file.

2. Description of Related Art

Currently, a time seeking operation in a transport stream (e.g., MPEG2-TS and BDAV MPEG2-TS) is used to determine a position in a file (hereinafter referred to as file position) corresponding to a user-selected time point when the file is played by a software player. However, the current time seeking method seeks the file position starting from the first packet of the file according to a sequential order. Thus, if the user-selected time point is near the end of the file, and the time length of the file is long (e.g., a feature length movie), a lot of time is wasted parsing so many packets of the file. Therefore, an efficient method for seeking a file position of a file is desired.

DETAILED DESCRIPTION

All of the processes described below may be embodied in, and fully automated via, functional code modules executed by one or more general purpose electronic devices or processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, or a tape drive.

In one embodiment, the file in this embodiment refers to a transport stream (TS). The TS may be an MPEG2-TS, a BDAV MPEG2-TS, or other suitable multimedia streams. The TS may include, but is not limited to, a video stream and a audio stream. For example, the video stream includes intra-coded frames (I-frames), predictive-coded frames (P-frames), and bidirectionally-predictive-coded frames (B-frames). Each transport stream includes a plurality of streams. For example, MPEG-2 specifies that the raw streams be divided into three kinds of levels: a frame level, a packetized elementary stream (PES) level, and a packet level. Each PES includes a header to store a presentation time stamp (PTS) of the PES.

Figure 1:
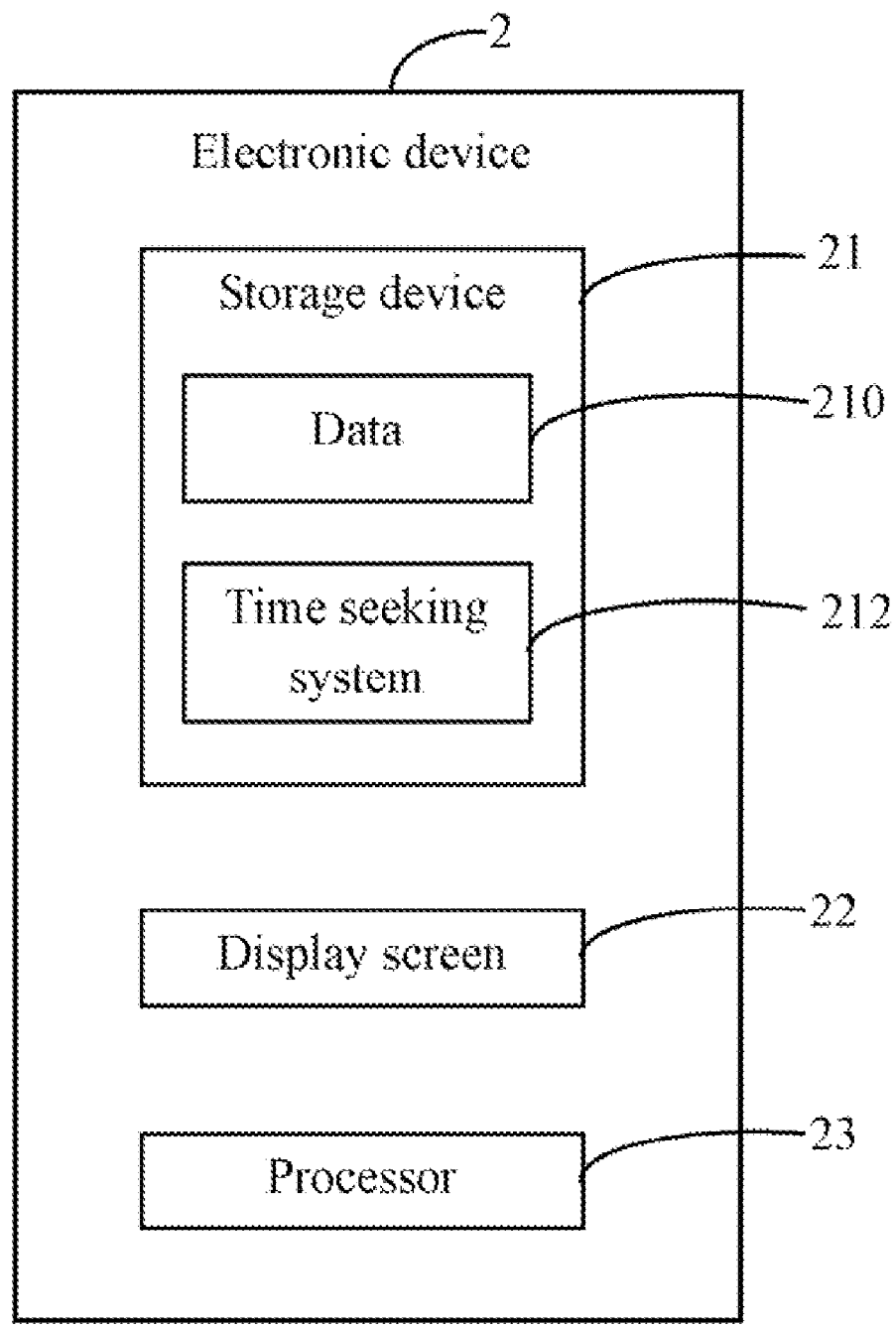
FIG. 1 is a block diagram of one embodiment of an electronic device including a time seeking system.

FIG. 1 is a block diagram of one embodiment of an electronic device 2 including a time seeking system 212. In one embodiment, the electronic device 2 may include a storage device 21, a display screen 22, and a processor 23. The storage device 21 may be used to store data 210 (e.g., a transport stream) and a time seeking system 212. The time seeking system 212 may be used to seek a file position according to a specified time point in a file. A detailed description will be given in the following paragraphs.

In one embodiment, the display screen 22 may be a liquid crystal display (LCD) or a touch-sensitive display, for example. The electronic device 2 may be a mobile phone, a personal digital assistant (PDA) or other suitable electronic device.

In one embodiment, the time seeking system 212 may include one or more modules. The one or more modules may comprise computerized code in the form of one or more programs that are stored in the storage device 21 (or memory). The computerized code includes instructions that are executed by the at least one processor 23 to provide functions for the one or more modules.

Figure 2:
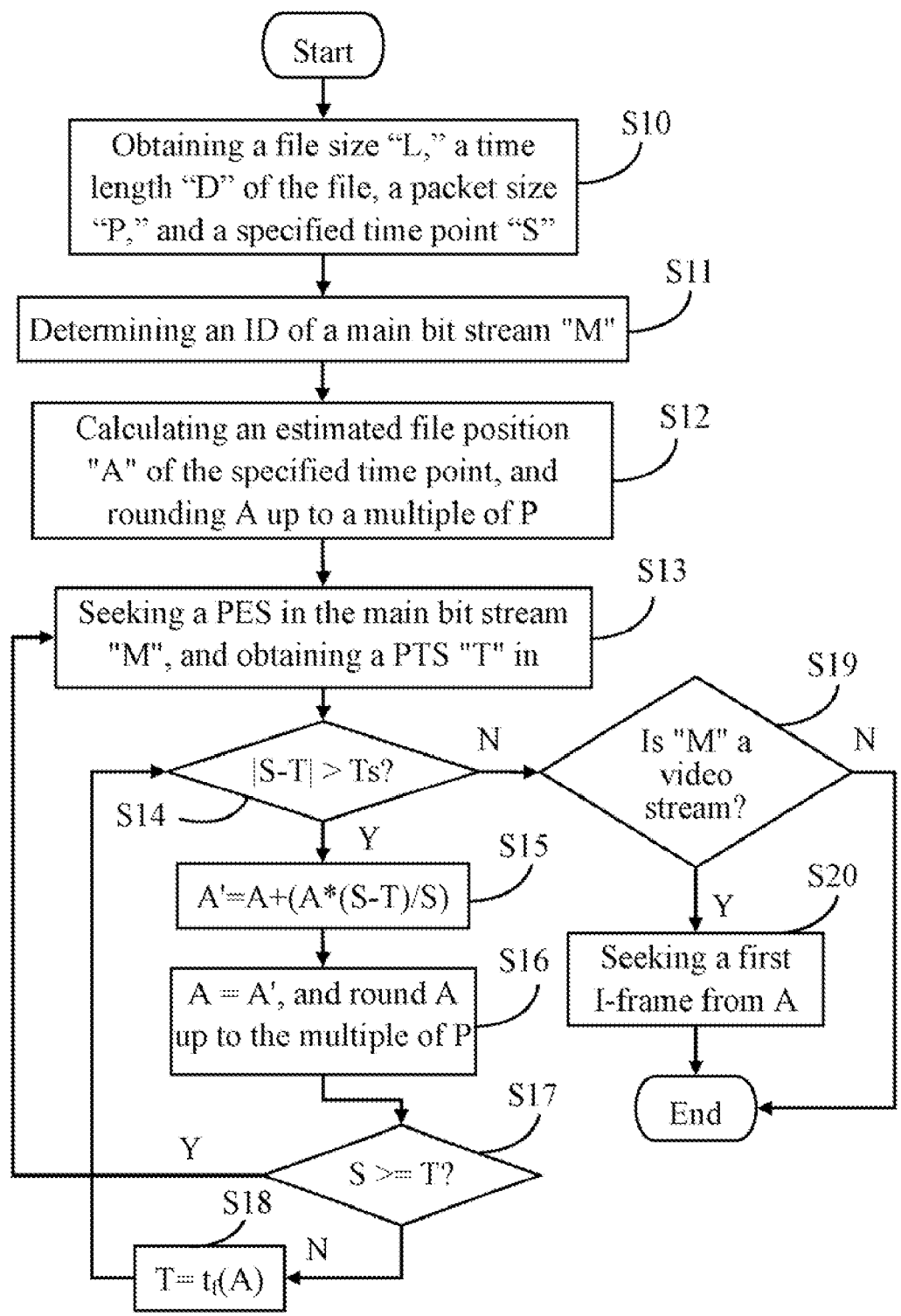
FIG. 2 is a flowchart of one embodiment of a method for seeking a file position of a file.

FIG. 2 is a flowchart of one embodiment of a method for seeking a file position of a file. The method in FIG. 2 may be performed by an electronic device (e.g. a mobile phone) having a touch-sensitive display with a graphical user interface (GUI), one or more processors, a storage device and one or more modules, programs or sets of instructions stored in the storage device for performing the method in FIG. 2. In one embodiment, the electronic device provides a plurality of functions, including wireless communication, for example. Depending on the embodiment, additional blocks may be added, others removed, and the ordering of the blocks may be changed.

In block S10, the time seeking system 212 obtains a file size "L," a time length "D" of the file, a packet size "P," and a specified time point "S" in the file. In one embodiment, the packet size "P" may be 188 bits (e.g., MPEG2-TS) or 192 bits (e.g., BDAV MPEG2-TS).

In block S11, the time seeking system 121 determines an identifier (ID) of a main bit stream "M" of the file. In one embodiment, the main bit stream "M" of the file is a first video stream of the file. An order of the video stream in the file is determined by the PTS of the video stream. The time length "D" of the file is equal to a difference value between a PTS of a first PES of the main bit stream "M" and a PTS of a last PES of the main bit stream "M."

In block S12, the time seeking system 121 calculates an estimated file position "A" corresponding to the specified time point according to the formula $A=L*(S/D)$, and rounds the estimated file position "A" up to a multiple of the packet size "P." In one embodiment, $A=N*P$, where "N" represents a positive integer, and $(N-1)*P \leq A \leq N*P$. For example, if A=4.6, and P=3, the time seeking system 212 determines N=2, and rounds A up to 6 (i.e., A=6).

In block S13, the time seeking system 212 seeks a PES of the main bit stream from the estimated file position "A" according to an inverse order (i.e., from "A" backward), and obtains a PTS "T" of the found PES of the main bit stream. The found PES of the main bit stream is the first stream nearest to the estimated file position "A." In one embodiment, for simplification, the block S13 is performed using the formula "$T=t_b(A)$."

In block S14, the time seeking system 212 determines if an absolute value |S−T| is greater than a preset value "Ts." If the absolute value |S−T| is greater than the preset value "Ts," the time seeking system 212 executes blocks S15-S18. Otherwise, if the absolute value |S−T| is less than or equal to the preset value "Ts," the time seeking system 212 executes block S19-S20. In one embodiment, the preset value "Ts" is a sample period of the main bit stream.

In block S15, the time seeking system 212 re-calculates the estimated file position "A" according to a preset estimation formula. In one embodiment, the preset estimation formula is $A'=A+(A*(S-T)/S)$. In other embodiments, the preset estimation formula may changed to correspond to different kinds of transport streams.

In block S16, the time seeking system 212 assigns a value of A' to a value of A (i.e., A=A'), and rounds A up to the next multiple of P. In other embodiments, the block S15 and S16 may be combined into one step, that is to say, the time seeking system 212 re-calculates the estimated file position "A" according to the preset estimation formula of A=A+(A*(S−T)/S), and rounds A up to the next multiple of P.

In block S17, the time seeking system 212 determines if the specified time point "S" is greater than or equal to the PTS "T" of the PES of the main bit stream. If S is greater than or equal to T, the procedure returns to block S13. Otherwise, if S is less than T, the procedure goes to block S18.

In block S18, the time seeking system 212 seeks again a PES of the main bit stream from the estimated file position "A" according to a sequential order (i.e., from "A" forward), and obtains a PTS "T" of the found PES of the main bit stream. The found PES of the main bit stream is the first stream nearest to the estimated file position "A." Then, the procedure returns to block S14. In one embodiment, the block S18 may be performed using the formula of "T=$t_f$(A)."

In block S19, the time seeking system 212 determines if the main bit stream "M" is a video stream. If the main bit stream "M" is the video stream, the procedure goes to block S20. Otherwise, if the main bit stream is not a video stream, the time seeking system 121 determines the last PES found in block S13 or block S18 is the accurate file position of the specified time point "S."

In block S20, the time seeking system 212 seeks a first I-frame from the estimated file position "A" according to the inverse order (i.e., from "A" backward in the file), and determines the PES of the first I-frame is an accurate file position of the specified time point "S."

Because the time seeking system 212 seeks an estimated file position "A" corresponding to a specified time point in the file, adjusts the estimated file position according to a preset estimation formula, and determines the estimated file position "A" is an accurate file position of the specified time point in the file until a difference between the estimated file position and the specified time point is less than a preset value. The seeking system 212 can quickly find the file position corresponding to the specified time point in the file, and save much time to avoid parsing an unnecessary number of packets of the file.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for seeking a file position of a file, the method comprising:
    (s1) obtaining a file size "L," a time length "D" of the file, a packet size "P," and a specified time point "S" in the file;
    (s2) determining an identifier (ID) of a main bit stream of the file;
    (s3) calculating an estimated file position "A" corresponding to the specified time point according to a formula of A=L*(S/D), and rounding A up to a multiple of P;
    (s4) seeking a packetized elementary stream (PES) of the main bit stream from the estimated file position "A" according to an inverse order, and obtaining a presentation time stamp (PTS) "T" of the found PES, the found PES of the main bit stream being the first stream nearest to the estimated file position "A";
    (s5) determining if an absolute value |S−T| is greater than a preset value, and executing steps (s6)-(s7) if the absolute value |S−T| is greater than the preset value, or executing step (s8) if the absolute value |S−T| is less than or equal to the preset value;
    (s6) re-calculating the estimated file position "A" according to a preset estimation formula, and rounding A up to the next multiple of P;
    (s7) returning to step (s4) if S is greater than or equal to T, or seeks again a PES of the main bit stream from the estimated file position "A" according to a sequential order if S is less than T, obtains a PTS "T" of the found PES, and returning to step (s5); and
    (s8) seeking a first I-frame from the estimated file position "A" according to the inverse order if the main bit stream is a video stream, and determining the PES of the first I-frame is an accurate file position of the specified time point "S," or determining the PES last found in step (s4) or (s7) is the accurate file position of the specified time point "S" if the main bit stream is not the video stream.

2. The method according to claim 1, wherein the preset estimation formula is A=A+(A*(S−T)/S).

3. The method according to claim 1, wherein the time length "D" of the file is equal to a difference value between a PTS of a first PES of the main bit stream and a PTS of a last PES of the main bit stream.

4. The method according to claim 1, wherein the main bit stream is a first video stream of the file.

5. The method according to claim 1, wherein the preset value in step (s5) is a sample period of the main bit stream.

6. An electronic device, the electronic device comprising:
    a display screen;
    a storage device;
    one or more processors; and
    one or more modules stored in the storage device and configured for execution by the one or more processors, the one or more modules including instructions to execute the following steps:
    (s1) obtaining a file size "L," a time length "D" of the file, a packet size "P," and a specified time point "S" in the file;
    (s2) determining an identifier (ID) of a main bit stream of the file;
    (s3) calculating an estimated file position "A" corresponding to the specified time point according to a formula of A=L*(S/D), and rounding A up to a multiple of P;
    (s4) seeking a packetized elementary stream (PES) of the main bit stream from the estimated file position "A" according to an inverse order, and obtaining a presentation time stamp (PTS) "T" of the found PES, the found PES of the main bit stream being the first stream nearest to the estimated file position "A";
    (s5) determining if an absolute value |S−T| is greater than a preset value, and executing steps (s6)-(s7) if the absolute value |S−T| is greater than the preset value, or executing step (s8) if the absolute value |S−T| is less than or equal to the preset value;
    (s6) re-calculating the estimated file position "A" according to a preset estimation formula, and rounding A up to the next multiple of P;
    (s7) returning to step (s4) if S is greater than or equal to T, or seeks again a PES of the main bit stream from the estimated file position "A" according to a sequential order if S is less than T, obtains a PTS "T" of the found PES, and returning to step (s5); and (s8) seeking a first I-frame from the estimated file position "A" according to the inverse order if the main bit stream is a video stream, and determining the PES of the first I-frame is an accurate file position of the specified time point "S," or determining the last PES found in step (s4) or (s7) is the accurate file position of the specified time point "S" if the main bit stream is not the video stream.

7. The electronic device according to claim 6, wherein the preset estimation formula is A=A+(A*(S−T)/S).

8. The electronic device according to claim 6, wherein the time length "D" of the file is equal to a difference value between a PTS of a first PES of the main bit stream and a PTS of a last PES of the main bit stream.

9. The electronic device according to claim 6, wherein the main bit stream is a first video stream of the file.

10. The electronic device according to claim 6, wherein the preset value is a sample period of the main bit stream.

11. A non-transitory storage medium having stored thereon instructions that, when executed by a processor of an electronic device, causes the processor to perform a method for seeking a file position of a file, the method comprising:
  (s1) obtaining a file size "L," a time length "D" of the file, a packet size "P," and a specified time point "S" in the file;
  (s2) determining an identifier (ID) of a main bit stream of the file;
  (s3) calculating an estimated file position "A" corresponding to the specified time point according to a formula of A=L*(S/D), and rounding A up to a multiple of P;
  (s4) seeking a packetized elementary stream (PES) of the main bit stream from the estimated file position "A" according to an inversed order, and obtaining a presentation time stamp (PTS) "T" of the found PES, the found PES of the main bit stream being the first stream nearest to the estimated file position "A";
  (s5) determining if an absolute value |S−T| is greater than a preset value, and executing steps (s6)-(s7) if the absolute value |S−T| is greater than the preset value, or executing step (s8) if the absolute value |S−T| is less than or equal to the preset value;
  (s6) re-calculating the estimated file position "A" according to a preset estimation formula, and rounding A up to the next multiple of P;
  (s7) returning to step (s4) if S is greater than or equal to T, or seeks again a PES of the main bit stream from the estimated file position "A" according to a sequential order if S is less than T, obtains a PTS "T" of the found PES, and returning to step (s5); and
  (s8) seeking a first I-frame from the estimated file position "A" according to the inverse order if the main bit stream is a video stream, and determining the PES of the first I-frame is an accurate file position of the specified time point "S," or determining the last PES found in step (s4) or (s7) is the accurate file position of the specified time point "S" if the main bit stream is not the video stream.

12. The non-transitory storage medium according to claim 11, wherein the preset estimation formula is A=A+(A*(S−T)/S).

13. The non-transitory storage medium according to claim 11, wherein the time length "D" of the file is equal to a difference value between a PTS of a first PES of the main bit stream and a PTS of a last PES of the main bit stream.

14. The non-transitory storage medium according to claim 11, wherein the main bit stream is a first video stream of the file.

15. The non-transitory storage medium according to claim 11, wherein the preset value is a sample period of the main bit stream.

\* \* \* \* \*